United States Patent [19]

Miyazaki et al.

[11] Patent Number: 5,028,770

[45] Date of Patent: Jul. 2, 1991

[54] BAR CODE READING APPARATUS WITH LASER SELECTION BASED ON A DEFLECTOR POSITION

[75] Inventors: Hiroyuki Miyazaki; Kazuhisa Shirakabe, both of Tokyo, Japan

[73] Assignee: NEC Corporation, Japan

[21] Appl. No.: 320,215

[22] Filed: Mar. 6, 1989

[30] Foreign Application Priority Data

Mar. 8, 1988 [JP] Japan .................. 63-55194

[51] Int. Cl.⁵ .............................. G06K 7/10
[52] U.S. Cl. ......................... 235/462; 235/466; 235/467
[58] Field of Search ............ 235/462, 466, 467, 465, 235/469; 250/255

[56] References Cited

U.S. PATENT DOCUMENTS

| | | | |
|---|---|---|---|
| 4,333,006 | 6/1982 | Gorin et al. | 235/457 |
| 4,639,606 | 1/1987 | Boles et al. | 235/462 |
| 4,730,293 | 3/1988 | Pierce et al. | 235/462 |
| 4,758,715 | 7/1988 | Stamm | 235/462 |
| 4,816,659 | 3/1989 | Bianco et al. | 235/462 |

FOREIGN PATENT DOCUMENTS

| | | | |
|---|---|---|---|
| 0152733 | 8/1985 | European Pat. Off. | 235/462 |
| 0028336 | 3/1978 | Japan | 235/462 |
| 0026623 | 5/1978 | Japan | 235/462 |
| 0231678 | 12/1984 | Japan | 235/462 |
| 0140481 | 7/1985 | Japan | 235/462 |
| 0233876 | 10/1986 | Japan | 235/462 |
| 0150486 | 7/1987 | Japan | 235/462 |
| 0248086 | 10/1987 | Japan | 235/462 |

Primary Examiner—Stuart S. Levy
Assistant Examiner—Kenton R. Mullins
Attorney, Agent, or Firm—Laff, Whitesel, Conte & Saret

[57] ABSTRACT

A bar code reading apparatus includes a light source device including at least one laser diode light source and having a function of emitting a plurality of laser beams, a mirror device, allowing the laser beams to pass therethrough, and directing reflected light in a specific direction, a deflection device having a deflector for receiving the laser beams passing through the mirror device and forming scanning lines for scanning a bar code symbol on an object to be read, a photoelectric transducer device for receiving reflection light corresponding to the laser light reflected by the object to be read through the deflection device and the mirror device, and a decoding device for decoding a signal obtained by the photoelectric transducer device. The laser beams radiated from the light source devices are emitted at different timings. The decoding device decodes the signal obtained by the transducer device in accordance with the timings of the laser beams emitted from the light source device.

12 Claims, 7 Drawing Sheets

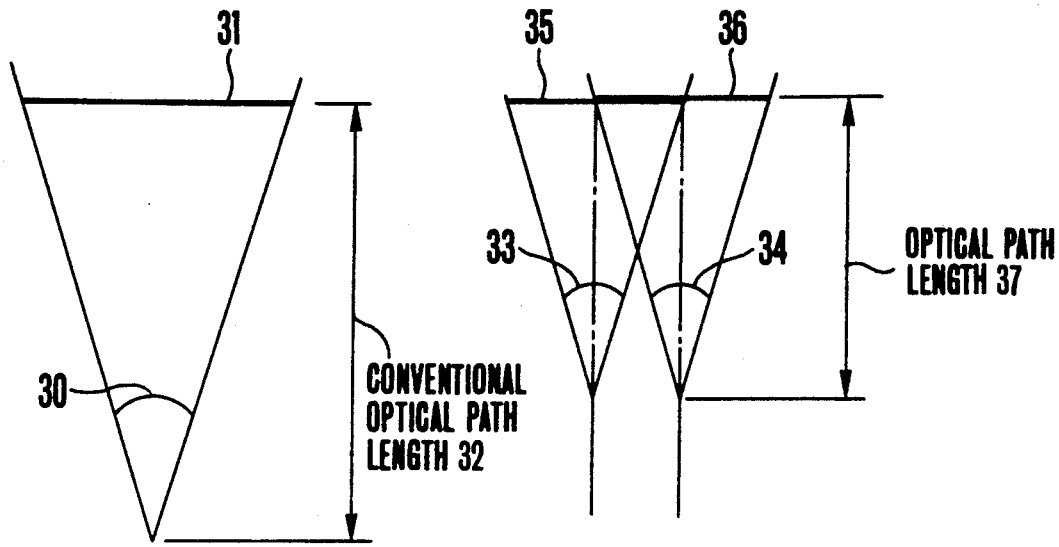
F I G. 4 (A)   F I G. 4 (B)
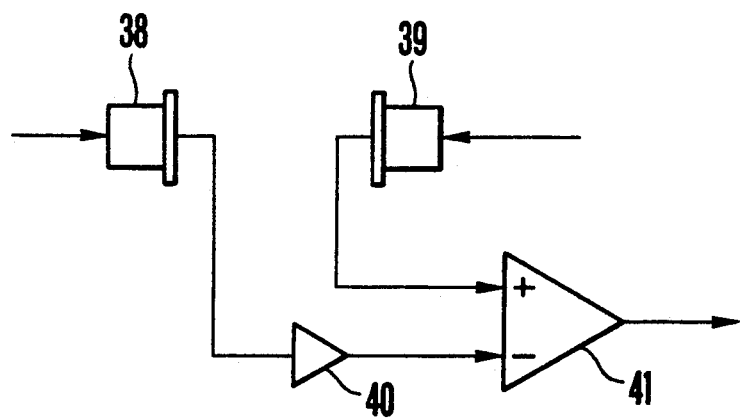
F I G. 5

– 1 –

BAR CODE READING APPARATUS WITH LASER SELECTION BASED ON A DEFLECTOR POSITION

BACKGROUND OF THE INVENTION

The present invention relates to a bar code reading apparatus for reading a bar code used for a sale management (POS: Point of Sale) system in a supermarket or the like.

As a conventional bar code reading apparatus (FIG. 8) for the POS system, one comprising a light source 50, a deflector 53, a pattern forming and light-receiving optical system 54, a photoelectric transducer 56, a video amplifier 57, and a decoder 58, as shown in FIG. 8. Or, as shown in FIG. 9, a reading apparatus may include a light beam output from a single laser oscillator 70 which is split into two beam components by a half mirror 71, a high-density scanning pattern 81 is formed by a deflector 75 and a scanning pattern forming optical system 79. A necessary digitized video signal is obtained by a light-receiving unit having photoelectric transducers 82 and 85, video amplifiers 83 and 86, and signal pre-processors 84 and 87, as shown in FIG. 9.

The conventional bar code reading apparatuses described above respectively have problems. More specifically, although the reading apparatus shown in FIG. 8 has a simple arrangement, since a scanning pattern is simple, a region where a reading rate is degraded is inevitably generated in view of reading performance. On the other hand, although the reading apparatus shown in FIG. 9 can eliminate the problem of FIG. 8 and can improve reading performance, since it has two scanning/light-receiving systems, cost is increased. In addition, since the number of components is increased, reliability is inevitably degraded. Recently, a sedentary operation is under an obligation in Northern European countries. Thus, a demand has arisen for a low-profile bar code reading apparatus to drastically improve operability. The above two bar code reading apparatuses pose a problem in this respect.

SUMMARY OF THE INVENTION

It is therefore a principal object of the present invention to provide a bar code reading apparatus with high reading performance, low cost, and high reliability.

It is another object of the present invention to provide a bar code reading apparatus capable of a sedentary operation with high operability.

In order to achieve the above objects, according to an aspect of the present invention, there is provided a bar code reading apparatus comprising: a light source device including at least one laser diode light source, the light source device having a function of emitting a plurality of laser beams, a mirror device, allowing the laser beams to pass therethrough, and directing reflected light in a specific direction, a deflection device having a deflector for receiving the laser beams passing through the mirror device and forming scanning lines for scanning a bar code symbol on an object to be read, a photoelectric transducer device for receiving reflection light corresponding to the scattered light reflected by the object to be read through the deflection device and the mirror device, and a decoding device for decoding a signal obtained by the photoelectric transducer device, wherein the laser beams radiated from the light source devices are emitted at different timings, and the decoding device decodes the signal obtained by the transducer device in accordance with the timings of the laser beams emitted from the light source device.

BRIEF DESCRIPTION OF THE DRAWINGS

FIGS. 4A and 4B are schematic views for explaining the reason why a bar code reading apparatus of the present invention can have a low-profile structure;

FIG. 5 is a block diagram showing a light-receiving system according to another embodiment of the present invention;

DESCRIPTION OF THE PREFERRED EMBODIMENTS

An embodiment of the present invention will now be described with reference to the accompanying drawings.

Figure 1:
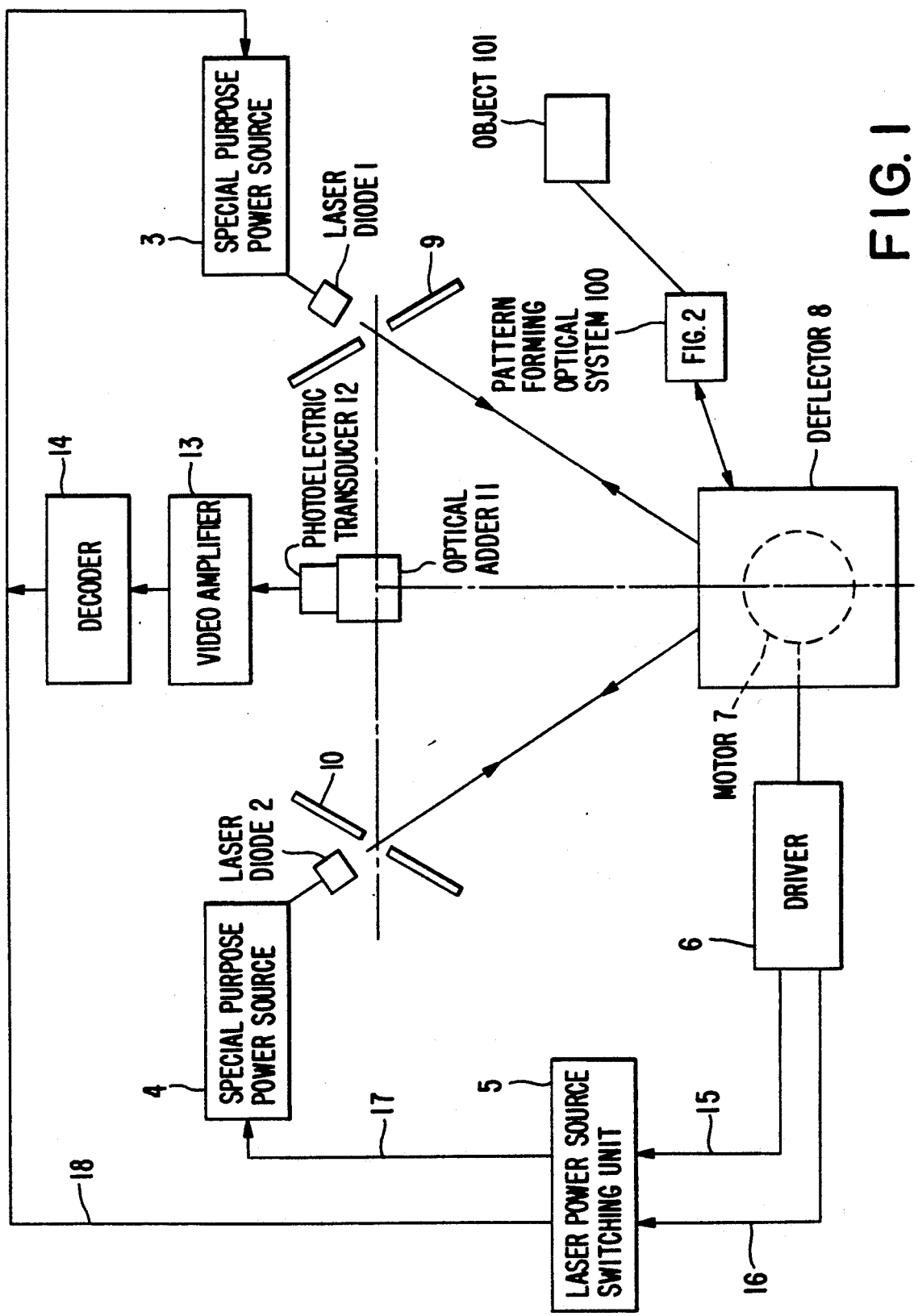
FIG. 1 is a block diagram showing an embodiment of the present invention.
Figure 2:
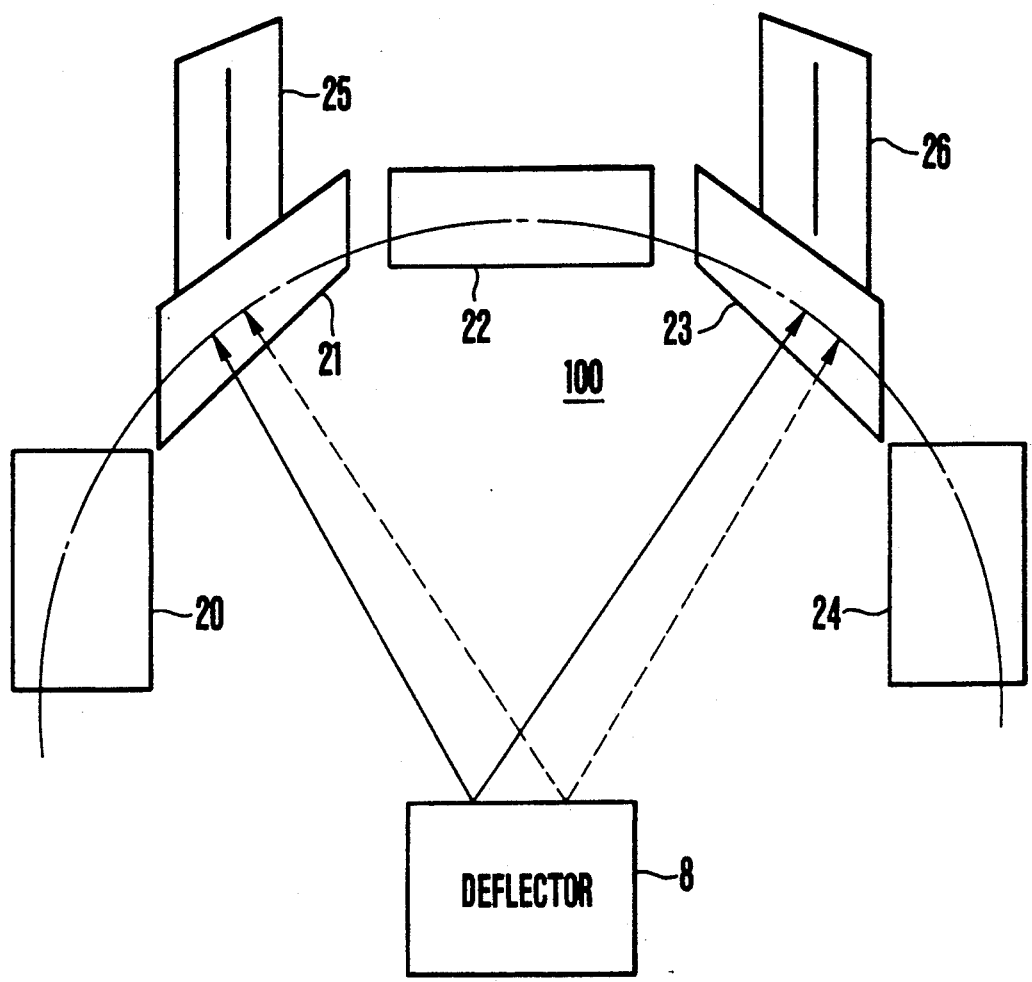
FIG. 2 is a schematic view showing a pattern forming optical system according to the embodiment shown in FIG. 1.
Figure 9:
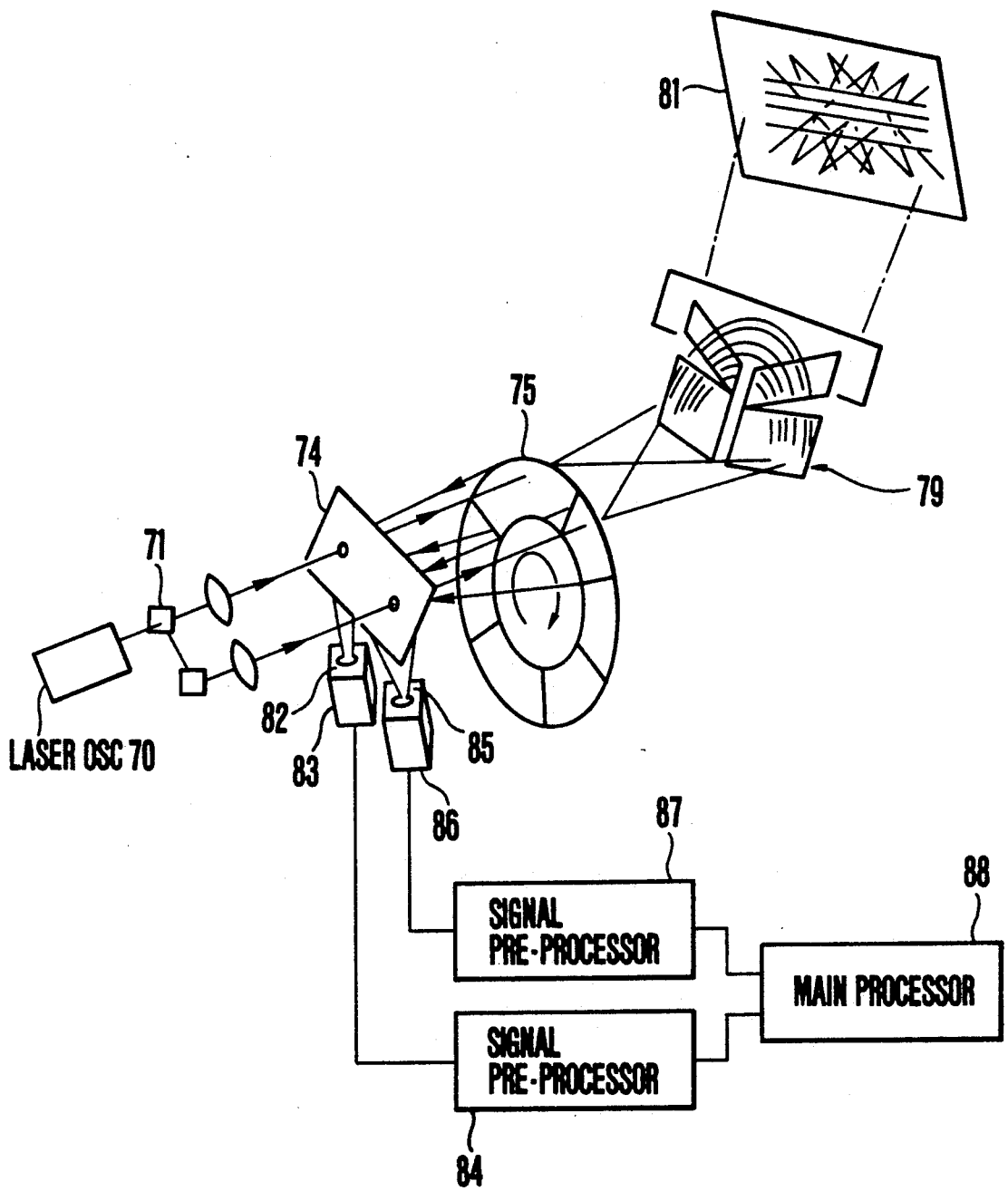
FIG. 9 is a block diagram showing another conventional bar code reading apparatus which improves the reading apparatus shown in FIG. 8.

In FIG. 1, a laser power supply switching unit 5 receives deflector position signals 15 and 16 obtained from a motor 7 and a driver 6 upon switching of a reflection surface of a deflector 8 (four-surface polygonal mirror in this embodiment). Laser diodes 1 and 2 separated at a distance are alternately driven by switching signals 17 and 18, for alternately switching power supplies 3 and 4 exclusively used for the laser diodes, which are output from the laser power supply switching unit 5. When the laser diode laser 1 is driven, a laser beam emitted from the laser diode 1 is reflected by the reflection surface of the deflector 8 through a perforated mirror 9 and deflected with rotation of the deflector 8, and the deflected beam is directed to a pattern forming optical system 100 having stationary reflection mirrors 20 to 24 shown in detail in FIG. 2, thus obtaining a desired scanning pattern. The scanning pattern can be obtained by a simpler arrangement than that of the conventional bar code reading apparatus shown in FIG. 9. The scanning pattern is radiated on a surface of object 101 to be read, thereby scanning a bar code symbol on the surface of the object.

Figure 3:
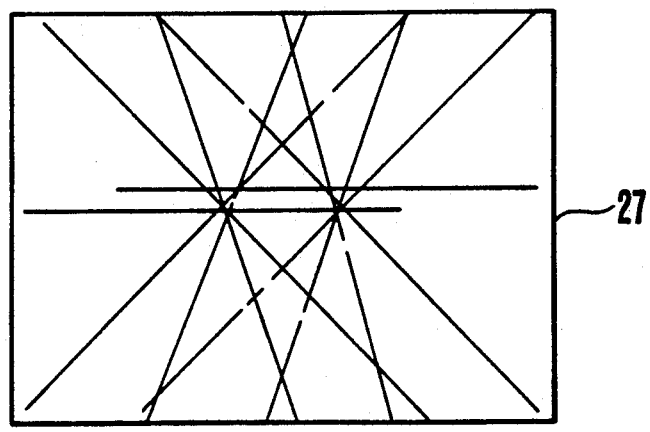
FIG. 3 is a plan view showing a scanning pattern obtained in the pattern forming optical system shown in FIG. 2.

FIG. 3 shows an example of the scanning pattern. Reflected lights obtained by scanning beams 27 shown in FIG. 3 respectively travel toward the perforated mirrors 9 and 10 along the same paths during scanning in a reverse direction, and are then directed toward an optical adder 11. The reflected lights are then added by the optical adder 11 to obtain a single light-receiving signal. The light receiving signal output from the adder 11 is supplied to a single photoelectric transducer 12. An electrical signal output from the photoelectric transducer 12 is amplified and digitized by a video amplifier 13, and is then decoded by a decoder 14.

By the bar code reading apparatus with the above arrangement, a non-readable region can be decreased. Since a necessary reading region can be covered with a pair of scanning patterns, a region to be covered with one scanning pattern need only be small. Therefore, an optical path length can be shortened if a deflection angle remains the same, thus realizing a low-profile bar code reading apparatus. Therefore, for a sedentary operation required in Northern European countries, operator's knees can be easily housed in a lower portion of a sacker incorporating the bar code reading apparatus, thus improving operability.

FIGS. 4A and 4B are presented to explain the reason why the bar code reading apparatus of the present invention can have a low-profile structure. In FIGS. 4A and 4B, assuming that a deflection angle 30 is equal to deflection angles 33 and 34 and the length of a scanning line 31 on the scanned surface is equal to a sum length of scanning lines 35 and 36, a necessary optical path length 37 becomes shorter than a conventional optical path length 32. Thus, the thickness of the bar code reading apparatus can be reduced by a difference between the above path lengths.

In the above embodiment, a rotating polygonal mirror is used as the deflector. However, even if a hologram disk or a vibration mirror is used in place of the rotating polygonal mirror, a bar code reading apparatus having the same performance as the above can be obtained.

The light-receiving optical system constituted by the optical adder and the photoelectric transducer may be constituted by two photoelectric transducers and an electrical signal adder, thus obtaining the same effect as in the above embodiment.

FIG. 5 shows such an embodiment. In FIG. 5, when outputs from photoelectric transducers 38 and 39 are supplied to a differential amplifier 41 while one output goes through an inverter 40, a sum result of the outputs is obtained as an output of the differential amplifier 41. The inverter 40 may be omitted, and one output may be input to the positive terminal of the differential amplifier while being current added, thus obtaining the same effect.

As described above, when the bar code reading apparatus of the present invention is used, since it has good reading performance, low cost, and high reliability, and can have a low-profile structure, a bar code reading apparatus capable of a sedentary operation can be realized.

Figure 6:
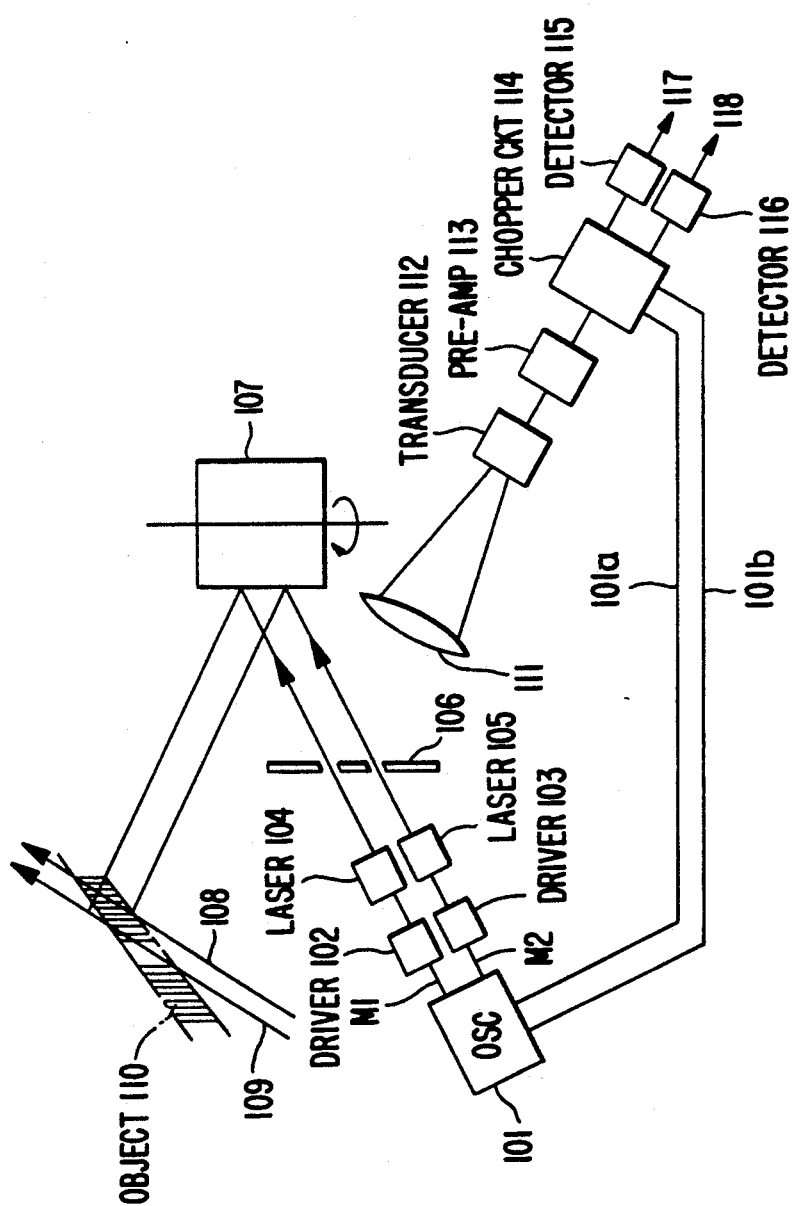
FIG. 6 is a block diagram showing still another embodiment of the present invention.

FIG. 6 shows still another embodiment of the present invention. In this embodiment, two laser diodes are used.

Figure 7:
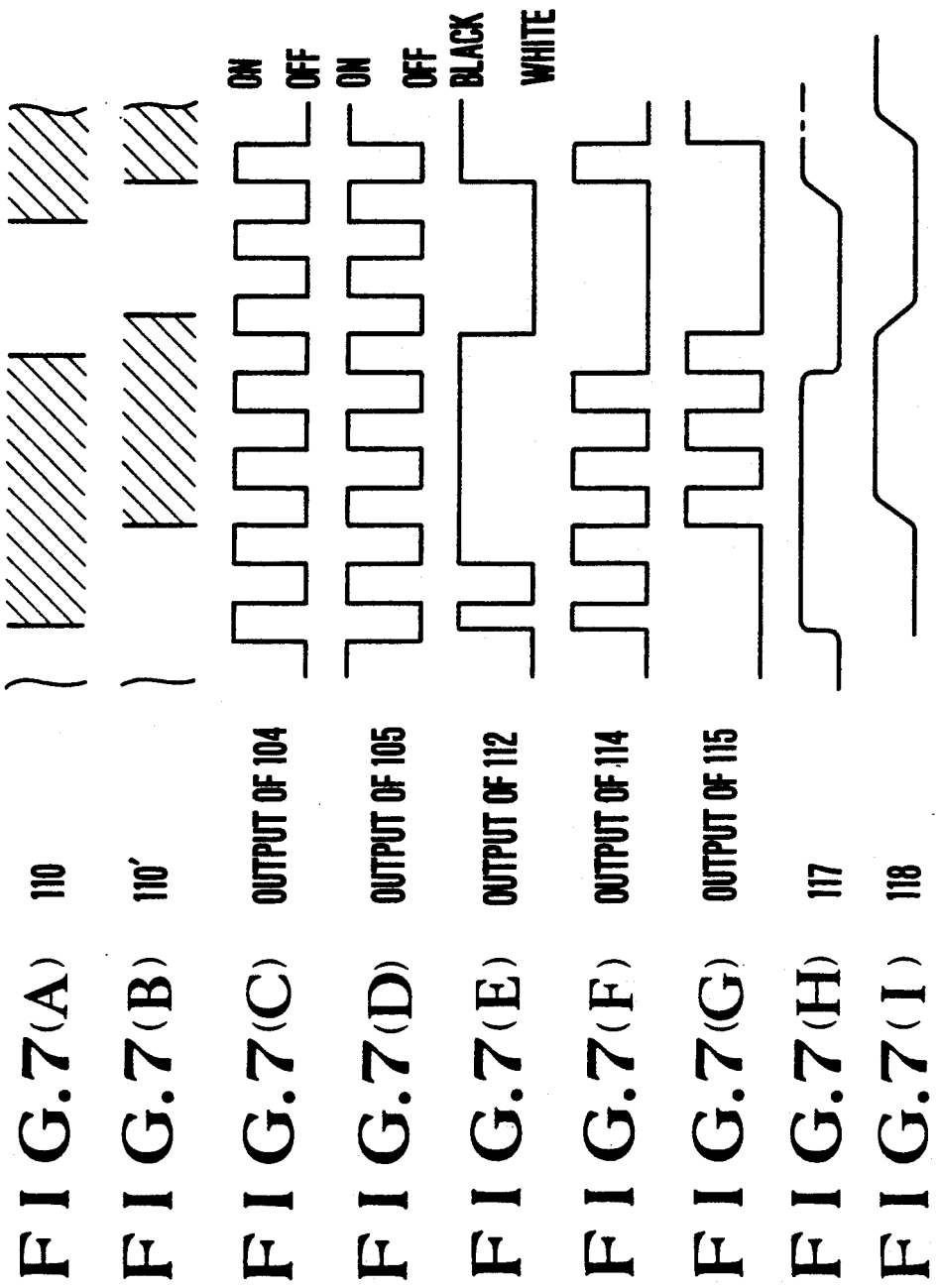
FIGS. 7A to 7I are timing charts showing waveforms at respective sections.
Figure 8:
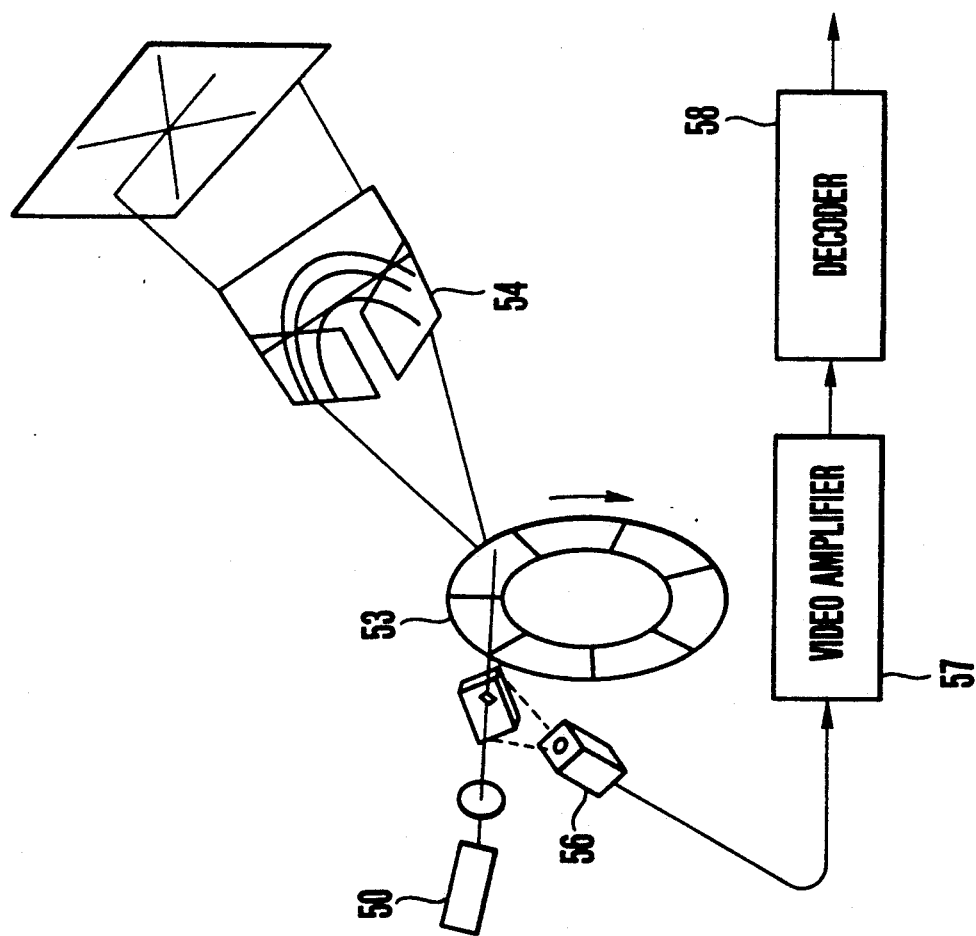
FIG. 8 is a block diagram showing a conventional bar code reading apparatus.

An oscillator 101 generates two modulation signals M1 and M2 having opposite polarities, and simultaneously generates signals having the same waveforms as those of the modulation signals as sync signals 101a and 101b for a chopper circuit 114. The modulation signals M1 and M2 are sent to visible laser diodes 104 and 105 through drivers 102 and 103, respectively, so as to drive the laser diodes. Thus, the laser diodes radiate laser beams having opposite polarities shown in FIGS. 7C and 7D. The laser beams radiated from the laser diodes 104 and 105 pass through a perforated mirror 106, and are deflected with rotation of a polygonal mirror 107, thus forming scanning lines 108 and 109, respectively. Different portions (110 and 110' in FIGS. 7A and 7B) of an object 110 to be read are scanned since the scanning lines 108 and 109 have a 180° phase difference. The scattered reflected lights propagate in a direction opposite to that of the projecting beams, and are directed by the perforated mirror 106. The directed reflected lights are fed to a photoelectric transducer 112 via a focusing system 111 and are converted to an electrical signal (FIG. 7E). The electrical signal is amplified by a pre-amplifier 113. The output from the pre amplifier 113 is separated by the chopper circuit 114 in response to the sync signals 101a and 101b, thus forming video signals shown in FIGS. 7F and 7G. These signals are supplied to detectors 115 and 116 to detect their envelopes, thereby obtaining video signals 117 and 118 shown in FIGS. 7H and 7I. These video signals are equivalent to those obtained by scanning the object 110 along the scanning lines 108 and 109 by two independent scanning apparatus.

As described above, according to the present invention, a plurality of laser diodes are synchronously driven, and a resultant signal is separated at a receiver by sync detection. As a result, the same effect as in scanning by a plurality of scanning apparatuses can be obtained by a simple arrangement. Therefore, an improvement of scan rate and a high-density scanning pattern which are limited when a single light source is used can be realized. Furthermore, since the laser diodes are alternately driven, a total operation time per diode can be shortened, thus assuring long service life.

If a plurality of scanning patterns are overlapped, the scan rate can be increased using identical patterns. If a spatial arrangement of the light source is modified, a density of the scanning patterns can be increased.

What is claimed is:

1. A bar code reading apparatus comprising:
    a light source device including at least one laser diode light source, said light source device having a function of emitting a plurality of laser beams;
    a mirror device for allowing the laser beams to pass therethrough and for directing reflected light in a specific direction;
    a deflection device having a deflector for receiving the laser beams passing through said mirror device and forming scanning lines for scanning a bar code symbol on an object to be read;
    wherein said deflection device comprises a motor for driving said deflector, a driver for driving said motor, and means for receiving signals from said driver and generating signals to operate a designated one of said laser diode light sources in order on the basis of a deflector position signals;
    an adder device for obtaining a single output by receiving the reflection light corresponding to each said laser diode and merging them,
    wherein the reflection light results from scattering and reflecting by the object to be read through said deflection device and said mirror device;
    a photoelectric transducer for converting said reflection light fed through said adder device, into and electrical signal; and
    a decoding device for decoding digitized video signals fed by said video amplifier,
    wherein the laser beams radiated from said light source devices are emitted at different timings, and said decoding device decodes the signal obtained by said transducer device in accordance with the timings of the laser beams emitted from said light source device.

2. An apparatus according to claim 1, wherein a video amplifier for amplifying said photoelectric transducer device output and separating said output into the video signal corresponding to said each laser diode light source to form digitized video signals.

3. A bar code reading apparatus comprising:
a plurality of laser diode light sources;
a mirror device, allowing laser beams emitted from said laser diode light sources to pass therethrough, and directing reflected light in a specific direction;
a deflection device having a deflector for receiving the laser beams emitted from said laser diode light sources and forming scanning lines for scanning a bar code symbol on an object to be read;
a photoelectric transducer device for converting reflected light which is obtained upon scanning of the bar code symbol, is directed by said deflector, and is directed by said mirror device, into an electrical signal;
a decoding device for decoding the electrical signal from said photoelectric transducer device;
a motor for rotating said deflector;
a driver for driving said motor;
a laser power supply switching unit for receiving a deflector position signal from said driver and outputting a switching signal for driving a designated one of said plurality of laser diode light sources; and
special-purpose power supplies arranged in correspondence with said plurality of laser diode light sources.

4. An apparatus according to claim 3, which further comprises a video amplifier for amplifying said photoelectric transducer device output, and separating said output into the video signal corresponding to said each laser diode light source to form digitized video signals.

5. An apparatus according to claim 3, wherein said mirror device comprises a perforated mirror allowing the laser beams to pass therethrough.

6. A bar code reading apparatus comprising:
an oscillator for generating different types of modulation signals;
a plurality of laser diode light sources driven by the modulation signals to emit laser beams, respectively;
a mirror device allowing laser beams emitted from said laser diode light sources to pass therethrough, and directing reflected light in a specific direction;
a driven dynamic deflection device having a deflector for receiving the laser beams passing through said mirror device, for dynamically forming scanning lines for scanning a bar code symbol on an object to be read, and for generating signals designating a laser diode based upon a dynamic deflection position of said deflector;
means responsive to said generated signal for operating a designated one of said laser diode light sources on a basis of said deflector position signal;
a photoelectric transducer device for receiving reflection light corresponding to the laser light reflected by the object to be read through said deflection device and said mirror device; and
a decoding device for decoding a signal obtained by said photoelectric transducer device.

7. An apparatus according to claim 6, wherein said decoding device includes a chopper circuit for code modulating the signal by separating the reflection light into a number of pulses corresponding to the laser light in response to the modulation signals.

8. An apparatus according to claim 6, wherein said mirror device comprises a perforated mirror allowing the laser beams to pass therethrough.

9. An apparatus according to claim 6, which further comprises a video amplifier for amplifying said photoelectric transducer device output, and separating said output into the video signal corresponding to said each laser diode light source to form digitized video signals.

10. A bar code reading apparatus comprising:
a plurality of laser diode light sources;
a mirror device for allowing laser beams emitted from said laser diode light sources to pass therethrough, and for directing reflected light in a specific direction;
a deflection device having a deflector for receiving the laser beams emitted from said laser diode light sources and forming scanning lines for scanning a bar code symbol on an object to be read;
a photoelectric transducer device for converting reflected light into an electrical signal, said reflected light being obtained upon a scanning of the bar code symbol, directed by said deflector, and directed by said mirror device;
a decoding device for decoding the electrical signal from said photoelectric transducer device;
a motor for rotating said deflector;
a driver for driving said motor;
a laser power supply switching unit for receiving a deflector position signal from said driver and outputting a switching signal for driving a designated one of said plurality of laser diode light sources; and
special-purpose power supplies arranged in correspondence with said plurality of laser diode light sources.

11. An apparatus according to claim 10, which further comprises a video amplifier for amplifying said photoelectric transducer device output, and separating said output into the video signal corresponding to said each laser diode light source to form digitized video signals.

12. An apparatus according to claim 10, wherein said mirror device comprises a perforated mirror allowing the laser beams to pass therethrough.

* * * * *